US005745569A

United States Patent [19]
Moskowitz et al.

[11] Patent Number: 5,745,569
[45] Date of Patent: Apr. 28, 1998

[54] METHOD FOR STEGA-CIPHER PROTECTION OF COMPUTER CODE

[75] Inventors: Scott A. Moskowitz, North Miami Beach, Fla.; Marc Cooperman, Palo Alto, Calif.

[73] Assignee: The Dice Company, Miami, Fla.

[21] Appl. No.: 587,943

[22] Filed: Jan. 17, 1996

[51] Int. Cl.$^6$ ........................................... H04L 9/00
[52] U.S. Cl. ..................... 380/4; 380/23; 380/25; 380/28; 380/49; 380/50; 380/54
[58] Field of Search ........................... 380/2, 4, 9, 21, 380/23, 25, 28, 49, 50, 54, 59; 283/73, 113, 17

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,748,668 | 5/1988 | Shamir et al. . |
| 4,908,873 | 3/1990 | Philibert et al. . |
| 4,979,210 | 12/1990 | Nagata et al. . |
| 4,980,782 | 12/1990 | Ginkel . |
| 5,073,925 | 12/1991 | Nagata et al. . |
| 5,287,407 | 2/1994 | Holmes . |
| 5,319,735 | 6/1994 | Preuss et al. . |
| 5,365,586 | 11/1994 | Indeck et al. . |
| 5,379,345 | 1/1995 | Greenberg . |
| 5,408,505 | 4/1995 | Indeck et al. . |
| 5,412,718 | 5/1995 | Narasimhalu et al. . |
| 5,428,606 | 6/1995 | Moskowitz . |
| 5,488,664 | 1/1996 | Shamir ........................... 380/54 |
| 5,530,759 | 6/1996 | Braudaway et al. ............ 380/54 |
| 5,606,609 | 2/1997 | Houser et al. .................. 380/4 |

OTHER PUBLICATIONS

Press, Flannery, Teukolsky and Vetterling, "Numerical Recipes in C", Cambridge University Press, 1988, 12. Fourier Transform Spectral Methods, pp. 398–470.

Pohlmann, Ken C., "Principles of Digital Audio", Third Edition, 1995, pp. 32–37, 40–48, 138, 147–149, 332, 333, 364, 499–501, 508–509, 564–571.

Pohlman, Ken C., "Principles of Digital Audio", Second Edition, 1991, pp. 1–9, 19–25, 30–33, 41–48, 54–57, 86–107, 375–387.

Schneier, B., "Applied Cryptography", John Wiley & Sons, Inc., New York 1994, particularly the following sections for steganography: 4.1 Subliminal Channel, pp. 66–68, 16.6 Subliminal Channel, pp. 387–392, particularly the following sections for cryptography Chapter 1: Foundations, pp. 1–16, Chapter 2: Protocol Building Blocks, pp. 17–41, Chapter 3: Basic Protocols, pp. 42–57, Chapter 12.1: Public-Key Algorithms Background, pp. 273–275, Chapter 14.1: One-Way Hash Functions, Background, pp. 321–324.

Kahn, D., "The Code Breakers", The Macmillan Company, 1969, particularly the following sections on steganography pp. xiii, 81–83, 513, 515, 522–526, 873.

*Primary Examiner*—Bernarr E. Gregory
*Attorney, Agent, or Firm*—Kenyon & Kenyon

[57] ABSTRACT

A method for protecting computer code copyrights by encoding the code into a data resource with a digital watermark. The digital watermark contains licensing information interwoven with essential code resources encoded into data resources. The result is that while an application program can be copied in an uninhibited manner, only the licensed user having the license code can access essential code resources to operate the program and any descendant copies bear the required license code.

20 Claims, No Drawings

METHOD FOR STEGA-CIPHER PROTECTION OF COMPUTER CODE

FIELD OF INVENTION

With the advent of computer networks and digital multimedia, protection of intellectual property has become a prime concern for creators and publishers of digitized copies of copyrightable works, such as musical recordings, movies, video games, and computer software. One method of protecting copyrights in the digital domain is to use "digital watermarks."

The prior art includes copy protection systems attempted at many stages in the development of the software industry. These may be various methods by which a software engineer can write the software in a clever manner to determine if it has been copied, and if so to deactivate itself. Also included are undocumented changes to the storage format of the content. Copy protection was generally abandoned by the software industry, since pirates were generally just as clever as the software engineers and figured out ways to modify the software and deactivate the protection. The cost of developing such protection was not justified considering the level of piracy which occurred despite the copy protection.

Other methods for protection of computer software include the requirement of entering certain numbers or facts that may be included in a packaged software's manual, when prompted at start-up. These may be overcome if copies of the manual are distributed to unintended users, or by patching the code to bypass these measures. Other methods include requiring a user to contact the software vendor and to receive "keys" for unlocking software after registration attached to some payment scheme, such as credit card authorization. Further methods include network-based searches of a user's hard drive and comparisons between what is registered to that user and what is actually installed on the user's general computing device. Other proposals, by such parties as AT&T's Bell Laboratories, use "kerning" or actual distance in pixels, in the rendering of text documents, rather than a varied number of ASCII characters. However, this approach can often be defeated by graphics processing analogous to sound processing, which randomizes that information. All of these methods require outside determination and verification of the validity of the software license.

Digital watermarks can be used to mark each individual copy of a digitized work with information identifying the title, copyright holder, and even the licensed owner of a particular copy. When marked with licensing and ownership information, responsibility is created for individual copies where before there was none. Computer application programs can be watermarked by watermarking digital content resources used in conjunction with images or audio data. Digital watermarks can be encoded with random or pseudo random keys, which act as secret maps for locating the watermarks. These keys make it impossible for a party to find the watermark without having the key. In addition, the encoding method can be enhanced to force a party to cause damage to a watermarked data stream when trying to erase a random-key watermark. Other information is disclosed in "Technology: Digital Commerce", Denise Caruso, New York Times, Aug. 7, 1995; and "Copyrighting in the Information Age", Harley Ungar, ONLINE MARKETPLACE, September 1995, Jupiter Communications.

Additionally, other methods for hiding information signals in content signals, are disclosed in U.S. Pat. No. 5,319,735—Preuss et al. and U.S. Pat. No. 5,379,345—Greenberg.

It is desirable to use a "stega-cipher" or watermarking process to hide the necessary parts or resources of the executable object code in the digitized sample resources. It is also desirable to further modify the underlying structure of an executable computer application such that it is more resistant to attempts at patching and analysis by memory capture. A computer application seeks to provide a user with certain utilities or tools, that is, users interact with a computer or similar device to accomplish various tasks and applications provide the relevant interface. Thus, a level of authentication can also be introduced into software, or "digital products," that include digital content, such as audio, video, pictures or multimedia, with digital watermarks. Security is maximized because erasing this code watermark without a key results in the destruction of one or more essential parts of the underlying application, rendering the "program" useless to the unintended user who lacks the appropriate key. Further, if the key is linked to a license code by means of a mathematical function, a mechanism for identifying the licensed owner of an application is created.

It is also desirable to randomly reorganize program memory structure intermittently during program run time, to prevent attempts at memory capture or object code analysis aimed at eliminating licensing or ownership information, or otherwise modifying, in an unintended manner, the functioning of the application.

In this way, attempts to capture memory to determine underlying functionality or provide a "patch" to facilitate unauthorized use of the "application," or computer program, without destroying the functionality and thus usefulness of a copyrightable computer program can be made difficult or impossible.

It is thus the goal of the present invention to provide a higher level of copyright security to object code on par with methods described in digital watermarking systems for digitized media content such as pictures, audio, video and multimedia content in its multifarious forms, as described in previous disclosures, "Steganographic Method and Device" Ser. No. 08/489,172, filed Jun. 7, 1995, now U.S. Pat. No. 5,613,004, and "Human Assisted Random Key Generation and Application for Digital Watermark System", Ser. No. 08/587,944, filed on Jan. 17, 1996, the disclosure of which is hereby incorporated by reference.

It is a further goal of the present invention to establish methods of copyright protection that can be combined with such schemes as software metering, network distribution of code and specialized protection of software that is designed to work over a network, such as that proposed by Sun Microsystems in their HotJava browser and Java programming language, and manipulation of application code in proposed distribution of documents that can be exchanged with resources or the look and feel of the document being preserved over a network. Such systems are currently being offered by companies including Adobe, with their Acrobat software. This latter goal is accomplished primarily by means of the watermarking of font, or typeface, resources included in applications or documents, which determine how a bitmap representation of the document is ultimately drawn on a presentation device.

The present invention includes an application of the technology of "digital watermarks." As described in previous disclosures, "Steganographic Method and Device" and "Human Assisted Random Key Generation and Application for Digital Watermark System," watermarks are particularly suitable to the identification, metering, distributing and authenticating digitized content such as pictures, audio, video and derivatives thereof under the description of "multimedia content." Methods have been described for combining both cryptographic methods, and steganography, or hiding something in plain view. Discussions of these technologies can be found in Applied Cryptography by Bruce Schneier and The Code Breakers by David Kahn. For more information on prior art public-key cryptosystems see U.S. Pat. No. 4,200,770 Diffie-Hellman, U.S. Pat. No. 4,218,582 Hellman, U.S. Pat. No. 4,405,829 RSA, U.S. Pat. No. 4,424,414 Hellman Pohlig. Computer code, or machine language instructions, which are not digitized and have zero tolerance for error, must be protected by derivative or alternative methods, such as those disclosed in this invention, which focuses on watermarking with "keys" derived from license codes or other ownership identification information, and using the watermarks encoded with such keys to hide an essential subset of the application code resources.

SUMMARY OF THE INVENTION

It is thus a goal of the present invention, to provide a level of security for executable code on similar grounds as that which can be provided for digitized samples. Furthermore, the present invention differs from the prior art in that it does not attempt to stop copying, but rather, determines responsibility for a copy by ensuring that licensing information must be preserved in descendant copies from an original. Without the correct license information, the copy cannot function.

An improvement over the art is disclosed in the present invention, in that the software itself is a set of commands, compiled by software engineer, which can be configured in such a manner as to tie underlying functionality to the license or authorization of the copy in possession by the user. Without such verification, the functions sought out by the user in the form of software cease to properly work. Attempts to tamper or "patch" substitute code resources can be made highly difficult by randomizing the location of said resources in memory on an intermittent basis to resist most attacks at disabling the system.

DETAILED DESCRIPTION

An executable computer program is variously referred to as an application, from the point of view of a user, or executable object code from the point of view of the engineer. A collection of smaller, atomic (or indivisible) chunks of object code typically comprise the complete executable object code or application which may also require the presence of certain data resources. These indivisible portions of object code correspond with the programmers' function or procedure implementations in higher level languages, such as C or Pascal. In creating an application, a programmer writes "code" in a higher level language, which is then compiled down into "machine language," or, the executable object code, which can actually be run by a computer, general purpose or otherwise. Each function, or procedure, written in the programming language, represents a self-contained portion of the larger program, and implements, typically, a very small piece of its functionality. The order in which the programmer types the code for the various functions or procedures, and the distribution of and arrangement of these implementations in various files which hold them is unimportant. Within a function or procedure, however, the order of individual language constructs, which correspond to particular machine instructions is important, and so functions or procedures are considered indivisible for purposes of this discussion. That is, once a function or procedure is compiled, the order of the machine instructions which comprise the executable object code of the function is important and their order in the computer memory is of vital importance. Note that many "compilers" perform "optimizations" within functions or procedures, which determine, on a limited scale, if there is a better arrangement for executable instructions which is more efficient than that constructed by the programmer, but does not change the result of the function or procedure. Once these optimizations are performed, however, making random changes to the order of instructions is very likely to "break" the function. When a program is compiled, then, it consists of a collection of these sub-objects, whose exact order or arrangement in memory is not important, so long as any sub-object which uses another sub-object knows where in memory it can be found.

The memory address of the first instruction in one of these sub-objects is called the "entry point" of the function or procedure. The rest of the instructions comprising that sub-object immediately follow from the entry point. Some systems may prefix information to the entry point which describes calling and return conventions for the code which follows, an example is the Apple Macintosh Operating System (MacOS). These sub-objects can be packaged into what are referred to in certain systems as "code resources," which may be stored separately from the application, or shared with other applications, although not necessarily. Within an application there are also data objects, which consist of some data to be operated on by the executable code. These data objects are not executable. That is, they do not consist of executable instructions. The data objects can be referred to in certain systems as "resources."

When a user purchases or acquires a computer program, she seeks a computer program that "functions" in a desired manner. Simply, computer software is overwhelmingly purchased for its underlying functionality. In contrast, persons who copy multimedia content, such as pictures, audio and video, do so for the entertainment or commercial value of the content. The difference between the two types of products is that multimedia content is not generally interactive, but is instead passive, and its commercial value relates more on passive not interactive or utility features, such as those required in packaged software, set-top boxes, cellular phones, VCRs, PDAs, and the like. Interactive digital products which include computer code may be mostly interactive but can also contain content to add to the interactive experience of the user or make the underlying utility of the software more aesthetically pleasing. It is a common concern of both of these creators, both of interactive and passive multimedia products, that "digital products" can be easily and perfectly copied and made into unpaid or unauthorized copies. This concern is especially heightened when the underlying product is copyright protected and intended for commercial use.

The first method of the present invention described involves hiding necessary "parts" or code "resources" in digitized sample resources using a "digital watermarking" process, such as that described in the "Steganographic Method and Device" patent application. The basic premise for this scheme is that there are a certain sub-set of executable code resources, that comprise an application and that are "essential" to the proper function of the application. In general, any code resource can be considered "essential" in that if the program proceeds to a point where it must "call" the code resource and the code resource is not present in memory, or cannot be loaded, then the program fails.

However, the present invention uses a definition of "essential" which is more narrow. This is because, those skilled in the art or those with programming experience, may create a derivative program, not unlike the utility provided by the original program, by writing additional or substituted code to work around unavailable resources. This is particularly true with programs that incorporate an optional "plug-in architecture," where several code resources may be made optionally available at run-time. The present invention is also concerned with concentrated efforts by technically skilled people who can analyze executable object code and "patch" it to ignore or bypass certain code resources. Thus, for the present embodiment's purposes, "essential" means that the function which distinguishes this application from any other application depends upon the presence and use of the code resource in question. The best candidates for this type of code resources are NOT optional, or plug-in types, unless special care is taken to prevent work-arounds.

Given that there are one or more of these essential resources, what is needed to realize the present invention is the presence of certain data resources of a type which are amenable to the "stega-cipher" process described in the "Steganographic Method and Device" patent U.S. Pat. No. 5,613,004. Data which consists of image or audio samples is particularly useful. Because this data consists of digital samples, digital watermarks can be introduced into the samples. What is further meant is that certain applications include image and audio samples which are important to the look and feel of the program or are essential to the processing of the application's functionality when used by the user. These computer programs are familiar to users of computers but also less obvious to users of other devices that run applications that are equivalent in some measure of functionality to general purpose computers including, but not limited to, set-top boxes, cellular phones, "smart televisions," PDAs and the like. However, programs still comprise the underlying "operating systems" of these devices and are becoming more complex with increases in functionality.

One method of the present invention is now discussed. When code and data resources are compiled and assembled into a precursor of an executable program the next step is to use a utility application for final assembly of the executable application. The programmer marks several essential code resources in a list displayed by the utility. The utility will choose one or several essential code resources, and encode them into one or several data resources using the stegacipher process. The end result will be that these essential code resources are not stored in their own partition, but rather stored as encoded information in data resources. They are not accessible at run-time without the key. Basically, the essential code resources that provide functionality in the final end-product, an executable application or computer program, are no longer easily and recognizably available for manipulation by those seeking to remove the underlying copyright or license, or its equivalent information, or those with skill to substitute alternative code resources to "force" the application program to run as an unauthorized copy. For the encoding of the essential code resources, a "key" is needed. Such a key is similar to those described in U.S. Pat. No. 5,613,004, the "Steganographic Method and Device" patent. The purpose of this scheme is to make a particular licensed copy of an application distinguishable from any other. It is not necessary to distinguish every instance of an application, merely every instance of a license. A licensed user may then wish to install multiple copies of an application, legally or with authorization. This method, then, is to choose the key so that it corresponds, is equal to, or is a function of, a license code or license descriptive information, not just a text file, audio clip or identifying piece of information as desired in digital watermarking schemes extant and typically useful to stand-alone, digitally sampled content. The key is necessary to access the underlying code, i.e., what the user understands to be the application program.

The assembly utility can be supplied with a key generated from a license code generated for the license in question. Alternatively, the key, possibly random, can be stored as a data resource and encrypted with a derivative of the license code. Given the key, it encodes one or several essential resources into one or several data resources. Exactly which code resources are encoded into which data resources may be determined in a random or pseudo random manner. Note further that the application contains a code resource which performs the function of decoding an encoded code resource from a data resource. The application must also contain a data resource which specifies in which data resource a particular code resource is encoded. This data resource is created and added at assembly time by the assembly utility. The application can then operate as follows:

1) when it is run for the first time, after installation, it asks the user for personalization information, which includes the license code. This can include a particular computer configuration;
2) it stores this information in a personalization data resource;
3) Once it has the license code, it can then generate the proper decoding key to access the essential code resources.

Note that the application can be copied in an uninhibited manner, but must contain the license code issued to the licensed owner, to access its essential code resources. The goal of the invention, copyright protection of computer code and establishment of responsibility for copies, is thus accomplished.

This invention represents a significant improvement over prior art because of the inherent difference in use of purely informational watermarks versus watermarks which contain executable object code. If the executable object code in a watermark is essential to an application which accesses the data which contains the watermark, this creates an all-or-none situation. Either the user must have the extracted watermark, or the application cannot be used, and hence the user cannot gain full access to the presentation of the information in the watermark bearing data. In order to extract a digital watermark, the user must have a key. The key, in turn, is a function of the license information for the copy of the software in question. The key is fixed prior to final assembly of the application files, and so cannot be changed at the option of the user. That, in turn, means the license information in the software copy must remain fixed, so that the correct key is available to the software. The key and the license information are, in fact, interchangeable. One is merely more readable than the other. In U.S. Pat. No. 5,613,004, the "Steganographic Method and Device, patent", the possibility of randomization erasure attacks on digital watermarks was discussed. Simply, it is always possible to erase a digital watermark, depending on how much damage you are willing to do to the watermark-bearing content stream. The present invention has the significant advantage that you must have the watermark to be able to use the code it contains. If you erase the watermark you have lost a key piece of the functionality of the application, or even the means to access the data which bear the watermark.

A preferred embodiment would be implemented in an embedded system, with a minimal operating system and memory. No media playing "applets," or smaller sized applications as proposed in new operating environments envisioned by Sun Microsystems and the advent of Sun's Java operating system, would be permanently stored in the system, only the bare necessities to operate the device, download information, decode watermarks and execute the applets contained in them. When an applet is finished executing, it is erased from memory. Such a system would guarantee that content which did not contain readable watermarks could not be used. This is a powerful control mechanism for ensuring that content to be distributed through such a system contains valid watermarks. Thus, in such networks as the Internet or set-top box controlled cable systems, distribution and exchange of content would be made more secure from unauthorized copying to the benefit of copyright holders and other related parties. The system would be enabled to invalidate, by default, any content which has had its watermark(s) erased, since the watermark conveys, in addition to copyright information, the means to fully access, play, record or otherwise manipulate, the content.

A second method according to the present invention is to randomly re-organize program memory structure to prevent attempts at memory capture or object code analysis. The object of this method is to make it extremely difficult to perform memory capture-based analysis of an executable computer program. This analysis is the basis for a method of attack to defeat the system envisioned by the present invention.

Once the code resources of a program are loaded into memory, they typically remain in a fixed position, unless the computer operating system finds it necessary to rearrange certain portions of memory during "system time," when the operating system code, not application code, is running. Typically, this is done in low memory systems, to maintain optimal memory utilization. The MacOS for example, uses Handles, which are double-indirect pointers to memory locations, in order to allow the operating system to rearrange memory transparently, underneath a running program. If a computer program contains countermeasures against unlicensed copying, a skilled technician can often take a snapshot of the code in memory, analyze it, determine which instructions comprise the countermeasures, and disable them in the stored application file, by means of a "patch." Other applications for designing code that moves to prevent scanning-tunnelling microscopes, and similar high sensitive hardware for analysis of electronic structure of microchips running code, have been proposed by such parties as Wave Systems. Designs of Wave Systems' microchip are intended for preventing attempts by hackers to "photograph" or otherwise determine "burn in" to microchips for attempts at reverse engineering. The present invention seeks to prevent attempts at understanding the code and its organization for the purpose of patching it. Unlike systems such as Wave Systems', the present invention seeks to move code around in such a manner as to complicate attempts by software engineers to reengineer a means to disable the methods for creating licensed copies on any device that lacks "trusted hardware." Moreover, the present invention concerns itself with any application software that may be used in general computing devices, not chipsets that are used in addition to an underlying computer to perform encryption. Wave Systems' approach to security of software, if interpreted similarly to the present invention, would dictate separate microchip sets for each piece of application software that would be tamperproof. This is not consistent with the economics of software and its distribution.

Under the present invention, the application contains a special code resource which knows about all the other code resources in memory. During execution time, this special code resource, called a "memory scheduler," can be called periodically, or at random or pseudo random intervals, at which time it intentionally shuffles the other code resources randomly in memory, so that someone trying to analyze snapshots of memory at various intervals cannot be sure if they are looking at the same code or organization from one "break" to the next. This adds significant complexity to their job. The scheduler also randomly relocates itself when it is finished. In order to do this, the scheduler would have to first copy itself to a new location, and then specifically modify the program counter and stack frame, so that it could then jump into the new copy of the scheduler, but return to the correct calling frame. Finally, the scheduler would need to maintain a list of all memory addresses which contain the address of the scheduler, and change them to reflect its new location.

The methods described above accomplish the purposes of the invention—to make it hard to analyze captured memory containing application executable code in order to create an identifiable computer program or application that is different from other copies and is less susceptible to unauthorized use by those attempting to disable the underlying copyright protection system. Simply, each copy has particular identifying information making that copy different from all other copies.

What is claimed is:

1. A method for copy protection of computer software, the computer software including executable code and a non-executable digital sample, said method comprising the steps of:

identifying a portion of the executable code to be encoded;

generating an encoded code resource from the identified portion of the executable code; and embedding the encoded code resource in the non-executable digital sample.

2. The method of claim 1, further comprising the step of requiring a predetermined key to decode the encoded code resource prior to execution of the executable code.

3. The method of claim 2, further comprising deriving the predetermined key from licensing information associated with the computer software.

4. The method of claim 3, wherein the licensing information is selected from a group comprising an owning organization name, a personal owner name, an owner address, a license code, a software serial number, a distribution parameter, an architectural requirement, a price parameter, and a software metering parameter.

5. The method of claim 1, further comprising the step of transferring the non-executable digital sample with the embedded encoded code resource to a user of the computer software.

6. The method of claim 5, wherein said transferring step further comprises storing the non-executable digital sample with the embedded encoded code resource on a storage medium selected from a group comprising a soft-sector magnetic disk, a hard-sector magnetic disk, a magnetic tape, a CD-ROM disc, a CD-R disc, a digital video disk, a magneto-optical disk and a memory cartridge.

7. The method of claim 5, wherein said transferring step further comprises transmitting the non-executable digital sample with the embedded encoded code resource over a transmission medium selected from a group comprising a telephone line, an SCSI, an Ethernet network, a token ring network, an ISDN, an ATM network, a TCP/IP network, an analog cellular network, a digital cellular network, a wireless network, a digital satellite, a cable network, a fiber optic network and an electric powerline network.

8. The method of claim 1, wherein the encoded code resource comprises a series of instructions for processing the non-executable digital sample.

9. The method of claim 8, wherein the computer software is installed on a computer system including a memory, said method further comprising the steps of:

decoding the encoded code resource; and loading the executable code into the memory of the computer system for execution.

10. A method for copy protection of computer software to be provided to an authorized user, the computer software including a plurality of code resources and a plurality of data resources, wherein each of the plurality of code resources includes a set of executable instructions, said method comprising the steps of:

selecting a code resource to be encoded;

using information relating to the authorized user to associate the selected code resource with a data resource; and encoding the selected code resource within the associated data resource.

11. The method of claim 10, wherein said step of selecting a code resource comprises selecting a code resource required for operation of the computer software.

12. The method of claim 11, wherein said step of using information relating to the authorized user to associate the selected code resource with a data resource comprises generating a key from the information and using the key to map a code resource to a data resource.

13. The method of claim 12, wherein the key comprises a pseudo-random number string.

14. The method of claim 10, further comprising the step of storing a set of instructions in the computer software for enabling the authorized user to extract and decode the encoded code resource.

15. The method of claim 14, wherein the set of instructions includes instructions for determining in which of the plurality of data resources the selected code resource is encoded.

16. A method for copy protecting a software application executed by a computer system, the software application including a plurality of executable code resources loaded in a memory of the computer system, said method comprising the steps of:

determining an address within the memory of the computer system associated with each of the plurality of executable code resources; and intermittently relocating each of the plurality of executable code resources to a different address within the memory of the computer during execution of the software application.

17. The method of claim 16, further comprising the step of modifying the software application to direct a call to an executable code resource to a memory scheduler.

18. The method of claim 17, wherein said step of intermittently relocating each of the plurality of executable code resources is performed in response to a call to an executable code resource received by the memory scheduler.

19. The method of claim 18, further comprising intermittently relocating the memory scheduler to a different address within the memory of the computer.

20. The method of claim 19, wherein said step of intermittently relocating the memory scheduler includes updating a reference to the memory scheduler in the memory of the computer system to reflect the different address within the memory of the computer.

* * * * *